No. 12,359. REISSUED JUNE 13, 1905.
E. A. RICHARDSON.
PLUG OR BUSH FOR CONNECTING WIRES OR BARS TO PIECES OF METAL.
APPLICATION FILED SEPT. 8, 1904.
Fig. 1,
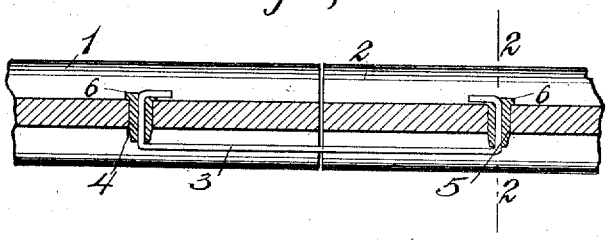
Fig. 2,
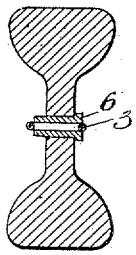
Fig. 3,
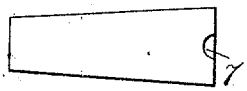
Fig. 4,
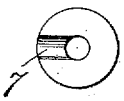
Fig. 6,
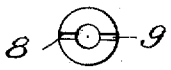
Fig. 5,
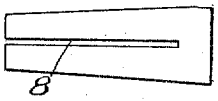
Fig. 7,
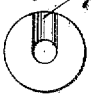
Fig. 9,
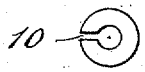
Fig. 8,
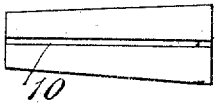
Fig. 10
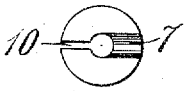
Fig. 12,
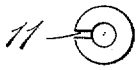
Fig. 11,
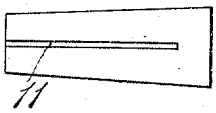
Fig. 13,
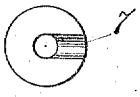
WITNESSES:
Harold L. Cochenour
Hugh Doyle
INVENTOR
Ernest Ardisana Richardson
BY
Nicholas M. Goodlette
his ATTORNEY.

No. 12,359. Reissued June 13, 1905.

UNITED STATES PATENT OFFICE.

ERNEST ARDISANA RICHARDSON, OF BORDEAUX, FRANCE, ASSIGNOR TO THE HALL SIGNAL COMPANY, A CORPORATION OF MAINE.

PLUG OR BUSH FOR CONNECTING WIRES OR BARS TO PIECES OF METAL.

SPECIFICATION forming part of Reissued Letters Patent No. 12,359, dated June 13, 1905.

Original No. 694,582, dated March 4, 1902. Application for reissue filed September 8, 1904. Serial No. 223,802.

*To all whom it may concern:*

Be it known that I, ERNEST ARDISANA RICHARDSON, a citizen of the United States, formerly residing at Charenton, in the Republic of France, but now residing at Bordeaux, France, have invented certain new and useful Improvements in Plugs or Bushes for Connecting a Wire or Bar to a Piece of Metal, of which the following is a specification.

This invention seeks to provide a plug or bush for use in a rail-bond which shall be capable of firmly connecting a wire or bar to a rail, so as to make a permanent and reliable electrical connection, and which shall be capable of being quickly secured in place without the use of special tools for driving the bond home. The plug or bond is made in the form of a contractible tube and is provided with a notch at one end to receive the bent portion of the wire. It is preferably made with a conical exterior surface—that is, with a taper substantially from end to end. In the best form the plug or bond also has a split from end to end on one side; but it may be split only part way, and in this latter case it may have one or more splits.

By means of the plug or bush forming the subject of the present invention perfect electrical connection is made, and the wire is not in direct contact with the rail or other piece of metal.

In the annexed drawings I have shown the two ends of the rails connected by a metal wire in order to insure free passage of an electric current between them. The wire is threaded through conical plugs, such as form the subject of the present invention.

Figure 1 is a sectional plan view of the abutting ends of two rails bonded together in accordance with my invention. Fig. 2 is a section on the line 2 2 of Fig. 1. Figs. 3 to 13 show modifications of the plug, all of which show the plug in conical form. The plug may be solid or unsplit, as shown in Figs. 3 and 4, or it may be split on two sides, the splits extending for a portion only of the length of the plug, as shown in Figs. 5, 6, and 7, in which 8 and 9 are the splits. Again, the plug may be split upon one side only, the split extending the whole length of the plug, as shown in Figs. 8, 9, and 10, in which 10 is the split. Again, the plug may be split on one side only, the split extending for a portion only of the length of the plug, as shown in Figs. 11, 12, and 13, in which 11 is the split. All these plugs when once in place completely surround the wire and prevent direct contact between the wire and the rail. In all cases the plugs are provided with a notch 7 in one end to receive the bent portion of the wire. This is the characteristic feature of the present invention.

The preferred method of employing these plugs is shown in Figs. 1 and 2, in which 1 and 2 are the portions of the rails to be connected together. The rails are provided with holes 4 and 5. A plug 6 is then inserted in a hole, as 5, in rail 2, and one end of the wire 3 is inserted through the bore of the plug or bond, said end of the wire projecting a short distance beyond the larger end of the bond. A few light taps of a hammer bends this end of the wire down into the notch 7 of the plug and starts the plug home. One or two heavy blows from a heavy hammer then drives the plug securely home, the plug contracting to grip the wire, and the end of the wire which is already bent into the notch 7 acting to hold the wire securely in place in the plug or bond during this driving operation. The driving blows fall upon the larger end of the plug and directly over the bent end of the wire resting in the notch 7; but this does not displace or injure the wire. The other end of the wire is of course connected with the rail 1 in the same way. If it were not for the notch 7 to receive the projecting end of the wire, a special tool, such as a "set," would have to be used to prevent the wire from being displaced or injured when the bond is driven home, and this would require greater care and more time than with my invention. When the conical plug 6 is driven home in the rail, it loses its conical form and conforms to the form of the hole which it enters. The deformation or cutting due to this squeezing action is borne by the plug.

I do not wish to limit myself to the details of carrying out the invention, which may be altered when necessary.

What I claim, and desire to secure by Letters Patent, is—

1. A plug or bush consisting of a contractible tube having a notch at one end, substantially as and for the purpose set forth.

2. A plug or bush consisting of a split tube having a notch at one end, substantially as and for the purpose set forth.

3. A plug or bush consisting of a conical contractible tube having a notch at one end, substantially as and for the purpose set forth.

4. A plug or bush consisting of a conical split tube having a notch at one end, substantially as and for the purpose set forth.

5. In a device of the character described, in combination with the metal part having a cylindrical opening or perforation, of a plug or bush adapted to be driven into said opening or perforation, said plug or bush having an external conical surface tapering from end to end, a notch 7, in its upper or larger face, and a recess splitting the plug or bush, and a wire adapted to enter a center or axial opening in said plug or bush and to be clamped tightly therein as the plug or bush is advanced in the perforation or opening in the metal part, said wire adapted, when bent at right angles to the axial opening of the plug, to rest in the notch 7, of said plug.

6. In a device of the character described, in combination with the metal part having a cylindrical opening or perforation, of a plug or bush adapted to be driven into said opening or perforation, said plug or bush having an external conical surface tapering from end to end, a notch 7, in its upper or larger face, and a recess splitting the plug or bush diametrically and extending longitudinally from the smaller toward the larger end, but not through said larger end, and a wire adapted to enter a center or axial opening in said plug or bush and to be clamped tightly therein as the plug or bush is advanced in the perforation or opening in the metal part, said wire adapted, when bent at right angles to the axial opening of the plug, to rest in the notch 7, of said plug.

In witness whereof I have hereunto signed my name in the presence of two subscribing witnesses.

ERNEST ARDISANA RICHARDSON.

Witnesses:

NICHOLAS M. GOODLETT, JR.,

FRANK TRENHOLM.